United States Patent Office 2,816,129
Patented Dec. 10, 1957

2,816,129

PROCESS FOR THE PRODUCTION OF TRIS(β-CYANOETHYL)-AMINE

Phillip D. Montgomery, Texas City, Tex., assignor to Monsanto Chemical Company, St. Louis, Mo., a corporation of Delaware No Drawing. Application July 23, 1956,
Serial No. 599,333

1 Claim. (Cl. 260—465.5)

The present invention relates to an improved process for the production of tris(β-cyanoethyl)-amine.

It is well known that acrylonitrile reacts with ammonia to yield a mixture of β-cyanoethylamines. The major product of the reaction is usually the secondary amine, bis(β-cyanoethyl)-amine, but the reaction has been described in U. S. Patent 1,992,615 and elsewhere for producing β-aminopropionitrile as well. Under certain critical reaction conditions reasonably good yields of the monocyanoethylated product can be achieved. Such special conditions or techniques are described, for example, in U. S. Patents 2,448,013 and 2,742,491. There is little information, however, in the literature about the preparation of the tris(β-cyanoethyl)-amine and the highest yield reported for this derivative from acrylonitrile is 6%.

A method has now been discovered whereby tris(β-cyanoethyl)-amine can be readily prepared in satisfactory yields. According to the invention, this tertiary amine is produced by reacting acrylonitrile with ammonium acetate. In the preferred embodiment of the invention, acrylonitrile and ammonium acetate are refluxed together in aqueous methanolic medium for a substantial period of time. The reaction mixture is then fractionated to remove unreacted acrylonitrile and the tris(β-cyanoethyl)-amine is isolated from the residue by extraction and crystallization using a suitable alcohol or other solvent.

Stoichiometric quantities of the reactants may be employed, that is, three moles of the acrylonitrile per mole of the ammonium salt, or equimolar quantities may be used. No special advantage is seen in using an excess of either reactant.

The reaction is carried out in an aqueous methanol medium, the proportions of water and methanol being such as to give a homogeneous mixture. Preferably, a 1:1 volume mixture is used.

The reaction is conducted at any temperature within the range from about 25 to 85° C. The preferred temperature is that at which the acrylonitrile is boiled with the ammonium salt under a reflux condenser and this will naturally vary slightly with the boil-up rate, concentration of reactants and solvent ratio. Generally, preferred temperatures lie in the range from 65 to 80° C. Pressure is not a critical variable, either atmospheric or superatmospheric pressures being suitable.

Reaction time may vary from periods as short as one hour to those of 24 hours or longer with the longer reaction periods favoring higher yields.

The following examples will further illustrate the manner in which the invention may be practiced but are not to be construed as limiting it in any manner except as it is limited in the appended claim. All parts given are by weight.

*Example 1*

To a 500-ml. flask fitted with a stirrer, a reflux condenser and a thermometer, there was charged 77 parts (1 mole) of ammonium acetate, 53 parts (1 mole) of acrylonitrile, 100-ml. of methanol and 100-ml. of water. While the mixture was stirred continuously, it was heated to about 68° C. at which temperature it began to reflux and it was then maintained under reflux conditions for a period of about 20 hours. The maximum temperature attained during the reaction period was 85° C. The reaction mixture was then fractionated to remove the unreacted acrylonitrile, methanol, and some water. The residue separated upon standing into an organic layer and a water layer. The organic layer, a yellow syrup, became semi-crystalline upon agitation and the crystalline mass was taken up in absolute ethanol and recrystallized therefrom to obtain 17.6 parts (yield 30%) of tris(β-cyanoethyl)-amine in the form of white crystals melting at 55–57° C. Literature value for tris(β-cyanoethyl)-amine is 59° C.). Results of an elemental analysis of the tertiary amine were as follows:

| | Percent C | Percent H | Percent N |
|---|---|---|---|
| Calculated | 61.36 | 6.82 | 31.81 |
| Found | 61.41 | 6.85 | 31.67 |
| | 61.56 | 6.91 | 31.71 |

*Example 2*

A 200-ml. rocker-type hydrogenation bomb was charged with 52 parts (0.67 mole) of ammonium acetate, 36 parts (0.68 mole) of acrylonitrile, 60-ml. of water and 60-ml. of methanol. The bomb was sealed, placed in the rocker, heated to 75° C. and left rocking with the temperature maintained within the range from 70 to 90° C. for about 23 hours. At the end of this time, the bomb was rapidly cooled and the contents were fractionated to remove the low boilers. The residue was poured into a separatory funnel and left standing overnight. The liquid was drained from the crystals which had formed in the separatory funnel and the solid product was twice recrystallized from absolute ethanol. The resulting tris(β-cyanoethyl)-amine melted sharply at 59° C. The yield in this instance was 12.2 parts or about 30%.

What is claimed is:

An improved process for the production of tris(β-cyanoethyl)-amine which comprises reacting acrylonitrile with ammonium acetate in an aqueous methanol medium at a temperature in the range from about 25° C. to about 85° C.

References Cited in the file of this patent

Weideman: Jour. Amer. Chem. Soc., vol. 67, pp. 1994–6 (1945).